United States Patent

[11] 3,524,404

| [72] | Inventors | Shinzo Kimura<br>Higashi-Osaka-shi, Japan<br>Hiroo Hosono, Osaka, Japan |
|---|---|---|
| [21] | Appl. No. | 723,072 |
| [22] | Filed | April 22, 1968 |
| [45] | Patented | Aug. 18, 1970 |
| [73] | Assignee | Matsushita Electric Industrial Co., Ltd.,<br>Osaka, Japan<br>a Corp. of Japan |
| [32] | Priority | April 25, 1967 |
| [33] | | Japan |
| [31] | | No. 42/27,187 |

[54] TOASTER
2 Claims, 15 Drawing Figs.

[52] U.S. Cl. .................................................. 99/390,
219/544
[51] Int. Cl. .................................................. A47j 37/08
[50] Field of Search ........................................ 219/544,
545, 213; 99/390, 389, 385, 393, 372, 377, 379

[56] References Cited
UNITED STATES PATENTS

| 1,321,462 | 11/1919 | Line ............................ | 219/544X |
| 1,586,738 | 6/1926 | Guy-Pell ...................... | 99/390 |
| 1,703,640 | 2/1929 | Predari ........................ | 219/544X |
| 1,912,353 | 5/1933 | Howe ........................... | 99/390X |
| 2,446,712 | 8/1948 | McIlvaine .................... | 219/544X |
| 2,489,500 | 11/1949 | Pulliam ....................... | 99/390X |
| 2,779,850 | 1/1957 | Gomersall .................... | 219/544X |
| 2,788,734 | 4/1957 | Weeks .......................... | 99/390 |
| 2,849,946 | 9/1958 | Palmer ......................... | 99/390 |
| 2,910,929 | 11/1959 | Sorenson ...................... | 99/390 |
| 2,916,984 | 12/1959 | Strauss ......................... | 99/390 |

Primary Examiner— Billy J. Wilhite
Attorney—Stevens, Davis, Miller and Mosher

ABSTRACT: A toaster of the type wherein a slice of bread is toasted by being placed between heating plates in direct contact therewith.

Patented Aug. 18, 1970

3,524,404

INVENTORS
SHINZO KIMURA
HIROO HOSONO

BY

ATTORNEYS 3,524,404

TOASTER

BACKGROUND OF THE INVENTION

1. Field of the Invention

The present invention relates to a toaster of the type wherein a slice of bread is toasted by being placed between heating plates in direct contact therewith.

2. Description of the Prior Art

Conventional toasters for toasting a slice of bread are mostly of the type in which the slice of bread is toasted by the radiation heat supplied to the surfaces of said slice of bread from heaters positioned in spaced relation to said surface of bread. Such method of toasting is not satisfactory because when the wattage is high, only the surfaces of the bread are toasted with insufficient heat reaching the interior of the bread and thus the toasted bread tastes bad, whereas when the wattage is low, the surfaces of the bread become excessively hard making the sense of touch by the teeth unpleasant and the taste unpalatable. Namely, according to this type of toaster, a satisfactory toasted bread cannot be obtained.

In order to produce tasteable toasted bread, the following requirements must generally be fulfilled. Namely:

1. To elevate quickly the interior of a slice of bread to a saturation temperature of 100°C for the conversion to $\alpha$ starch.
2. To minimize the evaporation of water content so as to retain the flavour and pleasant taste of said bread.
3. To toast the bread to a uniform color and to cause the melanoidine reaction and caramel reaction effectively.

SUMMARY OF THE INVENTION

An object of the present invention is to provide a toaster in which the mutual action of radiation heat and conduction heat are effectively utilized to accelerate the temperature rise of interior of bread and heat loss due to convection is minimized, whereby the evaporation of moisture in the interior of the bread is suppressed and a tasteful toast can be obtained.

Another object of the present invention is to provide a toaster by which the surfaces of a slice of bread can be toasted uniformly by conduction heat besides the conventional radiation heat.

According to the present invention, there is provided a toaster which, as a whole, is compact in size, and extremely slim in width, and low in price.

DESCRIPTION OF THE PREFERRED EMBODIMENTS

Figure 1:
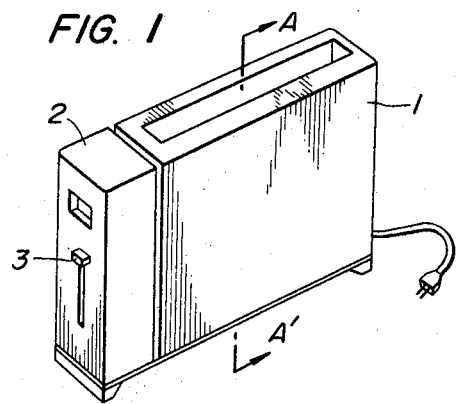
FIG. 1 is an overall perspective view of an embodiment of the toaster according to the present invention.

Referring first to FIG. 1, reference numeral 1 designates an outer casing of the toaster, 2 a casing for operating parts and 3 a knob by means of which the vertical movement of a bread support is effected.

Figure 2:
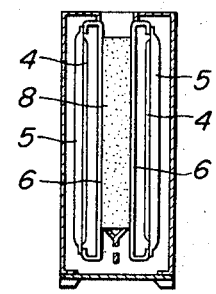
FIG. 2 is a cross-sectional view taken on the line A - A' of FIG. 1.
Figure 3:
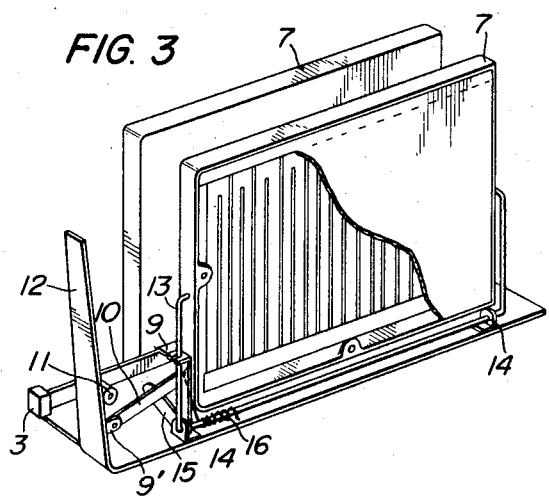
FIG. 3 is a perspective view, partly broken away, showing the arrangement interior of the toaster.

Describing the structure of the toaster of this invention with reference to FIG. 2, heating elements 4 are planar in shape and made of a material whose heat capacity is preferably as small as possible. Namely, as shown in FIG. 3, a heater unit is formed by punching a thin sheet (about 0.1mm. in thickness) of stainless steel into the shape of a zigzag connected juxtaposed strips and securing the opposite ends of the sheet by fixtures through the intermediary of an insulating material. Reference numeral 5 designates reflectors for the respective heating elements and 6 designates pressing plates disposed forwardly of the respective heating elements with a predetermined space therebetween for contact with a slice of bread to be toasted. The pressing plates each consist of a sheet of crystalline heat-resistant glass which is capable of directly absorbing part of the radiation heat generated by the heating element or a perforated metal sheet with the contacting surface thereof coated with a releasing compound such as Teflon. The pressing plate 6, heating element 4 and reflector 5 are combined integrally to compose the heater units 7 and a plurality of of such heater units are arranged so as to embrace a slice of bread 8 therebetween.

In FIG. 3, the bread support 9 has a portion thereof extending outwardly of the casing and the knob 3 is fixed to the free end of said extension. The bread support 9 is supported by a lever 10 which is pivotable about a pivot point 9' when the knob 3 is depressed. A roller 11 is rotatably mounted on a portion of the bread support 9. This roller 11 rolls on an inclined guide 12 extending upwardly from the base plate of the toaster when the bread support 9 is moved vertically by the pivotal movement of the lever 10 about the pivot point 9'. One of the heater units 7 is supported by a U-shaped lever 13 which is pivotable about pivot points 14 to move said heater unit in parallel relation toward or away from the other heater unit. A lever 15 which is provided to effect displacement of the heater unit 7 toward the slice of bread in response to the movement of the bread support 9, is pivotable about the common pivot point 14 with one end in engagement with the lever 13 and the other end in engagement with the lever 10 supporting the bread support 9. The heater unit 7 is biased by a spring 16 so as to go away from the slice of bread.

Figure 4A:
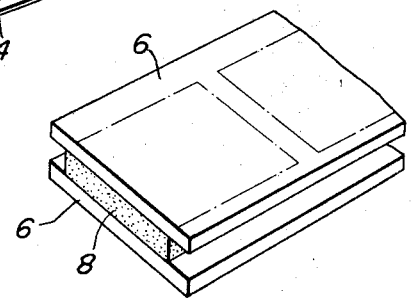
FIGS. 4A and 4B are fragmentary perspective views of different forms of a bread heating plate member.
Figure 4B:
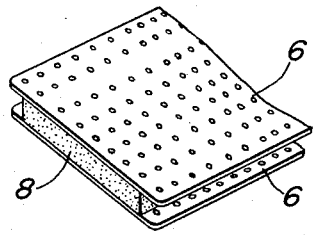

FIG. 4A shows the pressing plates each consisting of a transparent heat-resistant glass sheet, while FIG. 4B shows the pressing plates each consisting of a perforated metal sheet. Instead of providing the pressing plates, a transparent insulating layer may be formed directly on the confronting surfaces of low temperature heating elements. Further, although in the embodiment described and illustrated herein, use is made of a manually operated mechanism for causing a lateral displacement of one of the heater units toward another to hold a slice of bread therebetween, it is readily possible to rearrange the mechanism for automatic operation.

Figure 5A:
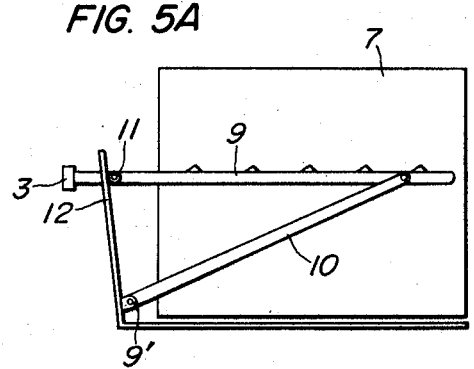
FIGS. 5A, 5B and FIGS. 6A, 6B are respective sets of views illustrating the operation of the toaster.
Figure 5B:
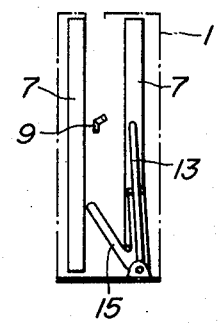
Figure 6A:
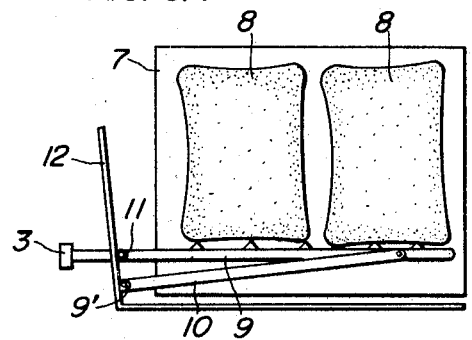
Figure 6B:
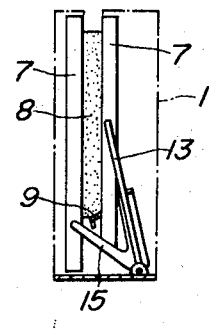

Next, the operation of the toaster described above and the principle upon which a slice of bread is toasted in the toaster will be described. First of all, slices of bread 8 are placed on the bread support 9 in a non-toasting position shown in FIG. 5 and then the bread support 9 is lowered to a toasting position as shown in FIG. 6. In this case, the lever 10 connected to the bread support 9 engages the lever 15 causing the lever 13, supporting one of the heater units 7, to rotate about the pivot points 14. Therefore, in the toasting position shown in FIG. 6 the slices of bread 8 are completely sandwiched in between the heater units 7 and thus the conduction heat from said heater units is absorbed by the slices of bread.

In this manner of toasting, it is possible to accelerate the temperature rise for the first cycle of toasting operation by supplying the bread with 20% or more of the direct radiation heat from the heating elements and thereby to uniformize the color reaction (melanoidine reaction or caramel reaction) on the surfaces of the slices of bread.

Figure 7:
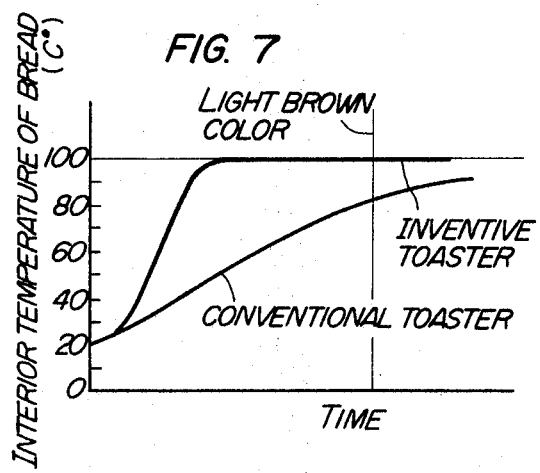
FIG. 7 is a chart illustrating the temperature rise characteristic interior of a slice of bread being toasted.

The manner of toasting according to the present invention will be analyzed hereunder. First of all, when comparing the temperature rise characteristic interior of the bread being toasted in the inventive toaster, which influences most the taste of the resultant toast, with that of bread being toasted in a conventional toaster of the type wherein use is made of radiation heat and convection heat only, the interior temperature of the bread in the inventive toaster rises to the saturation temperature of 100°C. throughout the bread at a rate about twice or more as high as the rate at which the interior temperature of bread in the conventional toaster rises, as shown in FIG. 7, owing to the absorption of the conduction heat from the heating elements. Thereafter, only the surfaces of the slice of bread are elevated to a scorching temperature (140°C. or higher) due to surface dehydration, with the interior thereof remaining at 100°C. Thus, the surfaces of the slice of bread are colored and the toasting is completed. On the other hand, according to the conventional manner of toasting the interior temperature of the bread does not reach 100°C. even upon expiration of the toasting period and further the amount of heat supplied to the interior of the bread is extremely small. As a result, less α-starch is produced interior of the bread and accordingly the resultant toast is rendered untasty.

Figure 8:
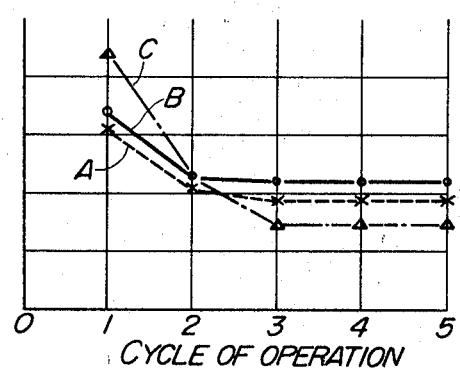
FIG. 8 is a chart illustrating in comparison the toasting time of conventional toasters and the inventive toaster.

Referring to FIG. 8 which compares the toasting times, it will be seen that the toasting time required for the toasting of a slice of bread by conduction heat only is relatively long as indicated by the line C due to the heat capacity of the pressing plates, but with the toaster of this invention wherein part of the radiation heat is used for toasting, the toasting time for the first cycle of the toasting operation can be made equal to or even shorter than that required by a conventional toaster as indicated by the line A. The line B represents the toasting time required by a conventional toaster of the type in which use is made of radiation heat for toasting.

Figure 9:
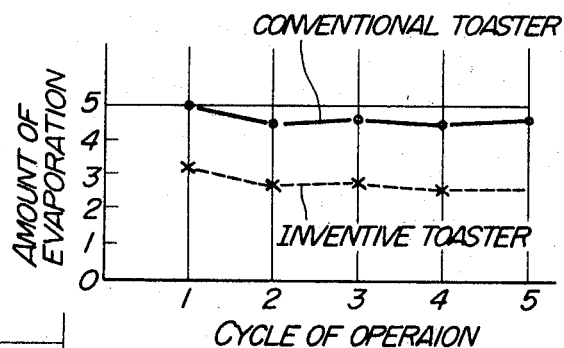
FIG. 9 is a chart illustrating in comparison the amount of evaporation from bread toasted by a conventional toaster and the inventive toaster.
Figure 10:
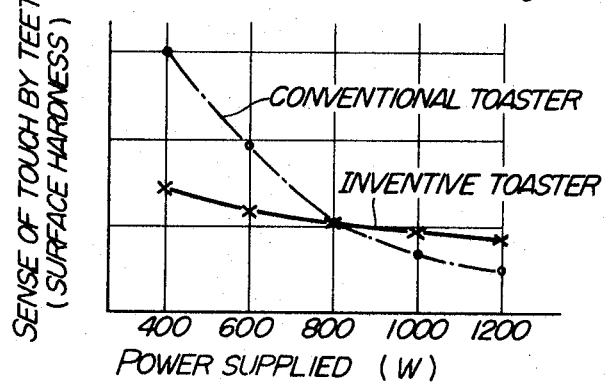
FIG. 10 is a chart illustrating in comparison the surface hardness of slices of bread toasted by a conventional toaster and the inventive toaster.
Figure 11:
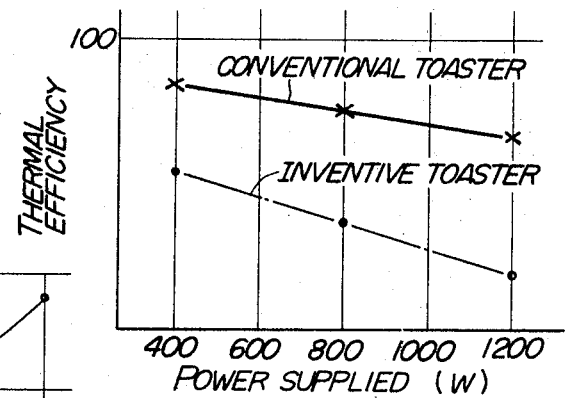
FIG. 11 is a chart illustrating in comparison the thermal efficiencies of a conventional toaster and the inventive toaster.
Figure 12:
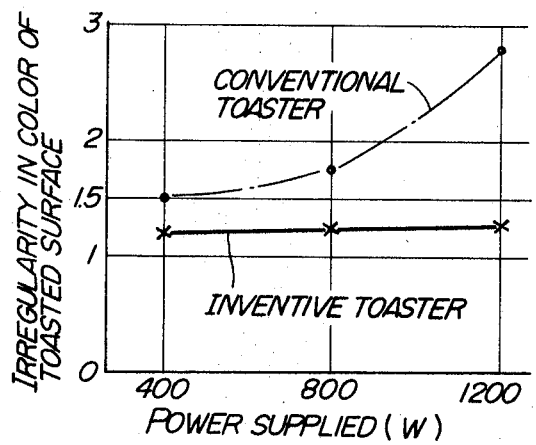
FIG. 12 is a chart illustrating in comparison the degrees of irregularity in the color of bread toasted by a conventional toaster and the inventive toaster.

Now, let us observe the state of toasting of the bread toasted by the inventive toaster. As will be seen from FIGS. 9 to 12 inclusive, the bread toasted by the inventive toaster has a very small amount of water removed therefrom as compared with the bread toasted by a conventional toaster, so that the interior of the bread remains suitably humid upon completion of toasting, retaining a sufficient amount of aromatic flavorous substances therein, and accordingly the toasted bread emits a highly attractive flavor (FIG. 9). Further, the slice of bread toasted by the inventive toaster has a very preferable surface hardness than that of bread toasted by a conventional toaster which has influence upon the sense of touch by the teeth and in addition the thickness of the hard surface layer is very small, so that the toasted bread will have a suitable hardness providing a good sense of touch by the teeth when served. Still further, with the inventive toaster, the hardness of the toasted bread is not varied substantially by a fluctuation in the power supply and therefore it is possible to obtain toasted bread of uniform hardness. Another advantage of the inventive toaster is that toasted bread can be obtained with a minimum irregularity in the color of the surface. Namely, the degree of toasting of a slice of bread toasted in a conventional toaster frequently varies between the upper and lower portions and such variation is particularly remarkable when a power of a high wattage is used, due to unbalance of the heat to which the slice of bread is subjected. However, by employing the toasting method according to the present invention the slice of bread is toasted uniformly by the conduction heat and radiation heat, and therefore toasted surfaces can be obtained which are substantially free of irregularity in toasting degree as shown in FIG. 12, even when a power of high wattage is used for the toasting. It should also be noted that according to the present invention the thermal efficiency is extremely high as will be appreciated from the interior temperature rise characteristic shown in FIG. 7, the thermal efficiency being about twice as high as that in a conventional toaster as shown in FIG. 11.

The conventional toasters used in the above-described characteristic comparisons are all of the type wherein toasting of bread is effected by making use of radiation heat and convection heat, or are those which are of the so-called pop-up type or the like in which a spacing is provided between each surface of a slice of bread and a heater. The toaster according to the present invention is so designed that the conduction heat occupies a major portion of the heat supplied to the slice of bread, with the remainder consisting of radiation heat. However, the percentage of radiation heat is preferably not less than 10% because toasted bread of the desired condition cannot be obtained when the radiation heat is less than 10%.

We claim:

1. A toaster comprising a pair of spaced apart heating plates adapted to bear against a bread surface and each of which is provided with a heating element in spaced relation thereto, a bread support which is vertically movable in the space defined between said pair of heating plates between a non-toasting position and a toasting position, and means for reducing the space between said heating plates in correspondence to said bread support being at said toasting position whereby a slice of bread placed on said bread support may be pressed between and by said pair of heating plates during toasting, and wherein said heating plates are perforated metal plates.

2. A toaster according to Claim 1, wherein the sum of the areas of the holes in each said perforated metal plate is not less than 10% of the area of said perforated metal plate.